United States Patent

Bradley et al.

[15] 3,646,854
[45] Mar. 7, 1972

[54] LOAD CELL WITH HIGH CROSS LOADING CAPACITY

[72] Inventors: Chester D. Bradley, Darien; Malcolm C. Tate, Stamford, both of Conn.

[73] Assignee: The A. H. Emery Company, New Canaan, Conn.

[22] Filed: Mar. 18, 1970

[21] Appl. No.: 20,665

[52] U.S. Cl. .................................................92/98, 177/208
[51] Int. Cl. ..............................................................F16j 3/00
[58] Field of Search ................92/98, 99, 100, 101; 177/208; 73/406

[56] References Cited

UNITED STATES PATENTS

| | | | |
|---|---|---|---|
| 2,648,573 | 8/1953 | Wheildon | 308/3 |
| 2,934,092 | 4/1960 | Saunders | 177/208 X |
| 3,145,795 | 8/1964 | Tate | 92/101 X |
| 3,251,119 | 5/1966 | Kingsbury et al. | 308/237 X |
| 3,273,470 | 9/1966 | Bradley | 92/101 |
| 3,339,462 | 9/1967 | Bankowski | 92/23 |
| 3,354,973 | 11/1967 | Farquhar | 177/208 |

FOREIGN PATENTS OR APPLICATIONS 739,398  8/1954  Great Britain .........................92/101

*Primary Examiner*—Edgar W. Geoghegan
*Assistant Examiner*—Leslie J. Payne
*Attorney*—Blair, Cesari and St. Onge

[57] ABSTRACT

An hydraulic load cell of the piston-cylinder type capable of withstanding high levels of cross loading. The piston and cylinder carrying members are assembled about roller bearings for free relative axial and angular telescopic movement. The cell is also provided with a flexible diaphragm which is extended over the roller bearings and secured to form an integral dust jacket, and with a sliding load head structure to absorb lateral thrust.

11 Claims, 4 Drawing Figures

PATENTED MAR 7 1972

INVENTORS
Chester D. Bradley
Malcolm C. Tate
BY
Blair, St.Onge + Mayers
ATTORNEYS

LOAD CELL WITH HIGH CROSS LOADING CAPACITY

BACKGROUND OF THE INVENTION

Hydraulic load cells of the piston and cylinder type are well known as mechanisms for weighing heavy or bulky loads. They must be constructed to move freely in a vertical direction and to resist binding if they are to be accurate, and particularly binding due to cross loads which are common in most weighing operations. Cross loads, which are loads applied at an angle to the load cell axis, may occur for example because of offcenter loading, thermal expansion or contraction of containers mounted to the load cells, or because of lateral movement across the load cells such as occurs when weighing rolling vehicles. Such cross loading if not provided for in the cell construction may result in cell damage and/or seriously impair accuracy, and thus provision must be made to accommodate such cross loads without binding.

In earlier load cells described in U.S. Pat. Nos. 2,960,113 and 2,089,518, binding due to cross loading was overcome by the use of three balls disposed in three separate races around the piston. The balls accommodate free axial movement of the piston without binding when subjected to cross loading. They also permit the loading surface of the cell to tilt without binding to adjust to the surface of the structure being weighed or to offcenter loading. This arrangement however has not been fully satisfactory because of high cost, a limited resistance to torque and because the entire cross load has to be borne by, at most, two balls which are therefore severely stressed and subject to failure under excessive cross loading.

An improvement on the earlier load cell construction is described in U.S. Pat. No. 3,273,470. In the improved structure cross loading is accommodated by a relatively large number of balls arranged in a single race between the piston and cylinder of the load cell. This structure also has certain disadvantages due to the cost of the plural balls, limited resistance to torque and to load restrictions based on the crushing strength of the individual balls.

Additionally, means have been provided in prior cells to further overcome cross loading directly in the load cell load head. Referring again to prior U.S. Pat. Nos. 2,960,113 and 3,089,518, this has been accomplished by the use of hardened steel ball bearings in the load head structure. The use of such ball bearings permits a degree of lateral movement to accommodate cross loading, particularly of the type caused by thermal expansion or contraction of containers secured to the load head; however, in this application also, the use of ball bearings is expensive and the individual balls may be subject to crushing under excessive axial loads. Thus the load capacity of the cell may be limited by the use of balls for load bearing.

Further, prior load cell constructions have required a separate flexible jacket or dust boot assembly to protect the moving parts of the load cell from dust, dirt and other abrasive or corrosive contaminants. Elimination of such a separate assembly is desirable to reduce the cost of added parts and to simplify assembly and maintenance of the cell.

Accordingly, representative objects of the present invention are to provide a load cell having an improved construction for accommodating cross loading and torque and reducing error produced thereby, both in the body of the cell and in the load head, to provide a cell having an integral dust boot, and to provide a cell which is simply constructed, economical, accurate and reliable.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

SUMMARY OF THE INVENTION

The present invention relates to load cells and more particularly to hydraulic load cells having improved means for accommodating cross loading, torque and thermal expansion, and an integral protective dust jacket.

The cell comprises a base member having an integral piston portion. The base member is telescopically assembled with a second member having a cylinder portion which telescopically receives the piston portion. The telescoping sides of the base member and second member are spaced to provide elongated, linear races extending along their length which accommodate elongated, linear roller bearings. The roller bearings permit free relative axial and angular movement between the base member and the second member and are extremely effective in resisting torque and preventing binding due to cross loading. More particularly, roller bearings will function satisfactorily in a load cell application under extremely high levels of torque and cross loading in comparison to ball bearings, and they are also more economical and reliable.

The load cell is further provided with a flexible diaphragm interposed between the piston and cylinder portion to form a sealed fluid pressure chamber. The diaphragm of the invention, however, in contrast to that in prior art load cells, is not terminated closely adjacent the fluid pressure chamber. It is preferably extended laterally over the races and roller bearings, and secured to form a protective jacket which helps prevent the intrusion of dust or other abrasive or corrosive contaminants into the roller bearing races.

A sliding load head structure is also preferably provided on the load cell. The load head structure is slidably mounted on the load cell loading surface and thus is able to move and absorb lateral thrust due to thermal expansion or contraction of members which are mounted to the load head, or due to rolling vehicles. In this way excessive cross loading on the bearings due to such lateral thrust is prevented.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawing.

DESCRIPTION OF THE PREFERRED EMBODIMENTS

Figure 1:
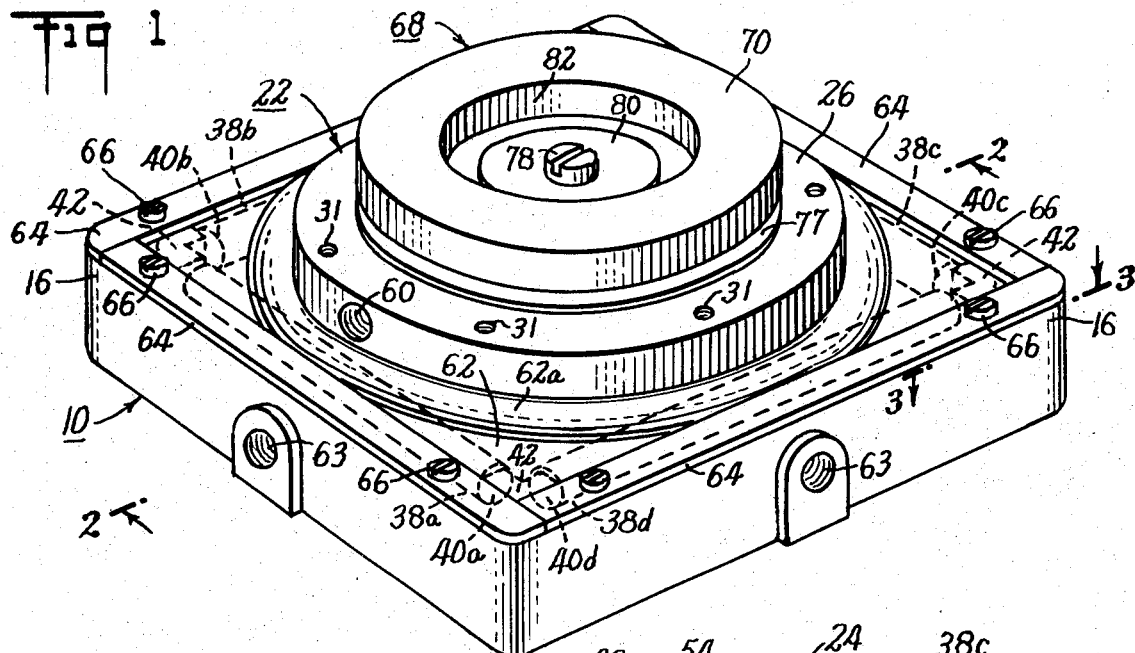
FIG. 1 is a front perspective view of the load cell of the invention.
Figure 2:
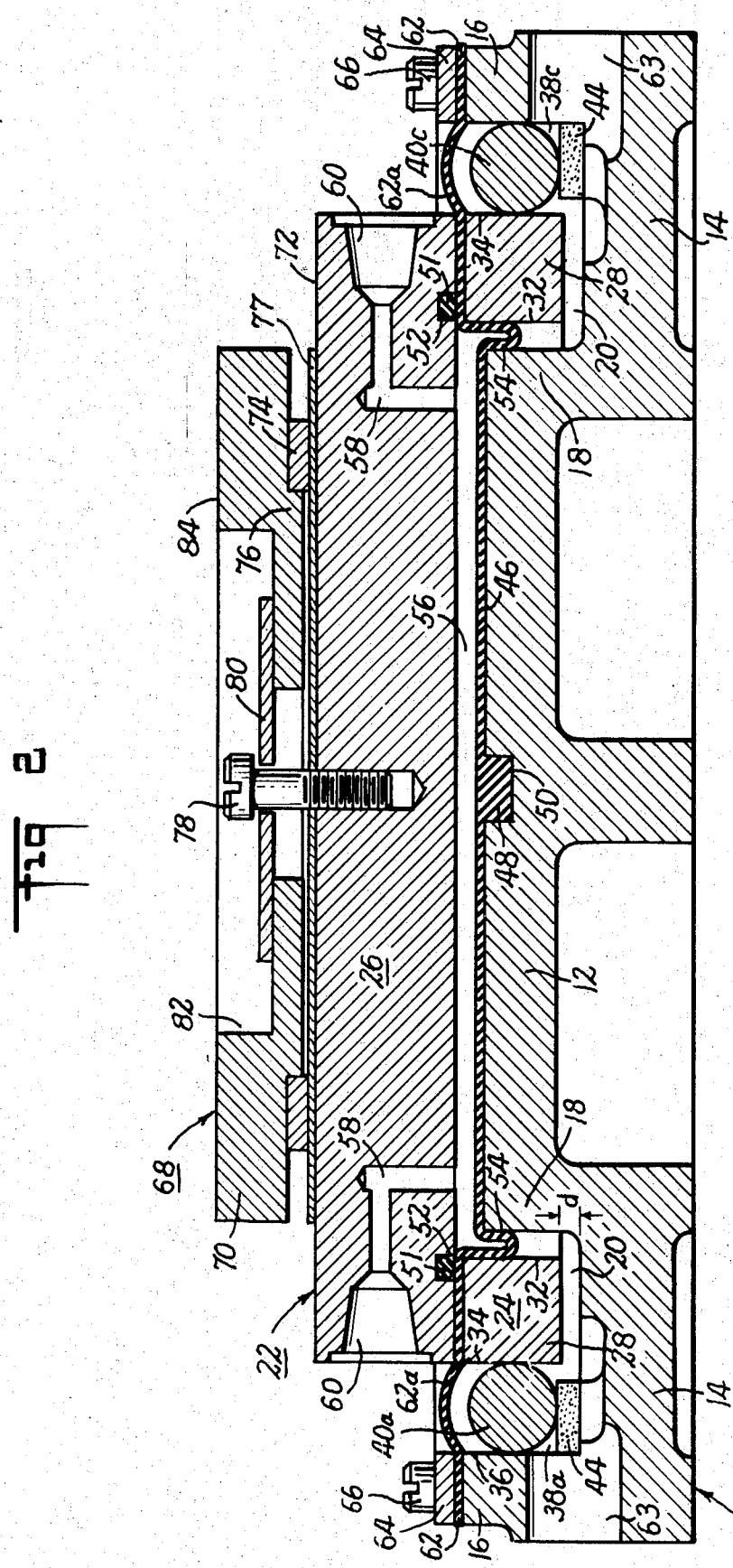
FIG. 2 is an enlarged sectional elevation view taken along line 2—2 of FIG. 1.

Referring now to FIGS. 1 and 2, the load cell of the invention comprises a base member 10 having a raised, central piston portion 12 of cylindrical configuration. Piston portion 12 is surrounded by a lateral flange 14 which terminates in a raised outer rim 16 of preferably square configuration as shown in FIG. 1. Rim 16 in conjunction with the sidewall 18 of piston portion 12 thus define between them a ring-shaped well 20 surrounding piston portion 12. Well 20 is of circular configuration along its inner diameter and of square configuration along its outer diameter.

A second member 22, which defines a cooperating cylinder portion 24 for piston portion 12, is telescopically assembled with base member 10 as shown in FIG. 2. Member 22 comprises a flat cap block 26 of preferably cylindrical configuration (FIG. 1) to which is concentrically mounted a cylinder ring 28 (FIG. 2). Cylinder ring 28 may be secured to cap block 26 by a series of capscrews 30 threadedly received in a series of tapped holes 31 around the periphery of cap block 26 (FIGS. 1 and 4). Cylinder ring 28 as shown in FIG. 3 is provided with a cylindrically configured inner surface 32 and an outer surface 34 of square configuration, and thus corresponds to the configuration of well 20 into which it is telescopically received as shown in FIGS. 2 and 4.

Still referring to FIGS. 2 and 4, member 22 is telescopically assembled with base member 10 so that a relatively narrow space is left between inner surface 32 of cylinder ring 28 and surface 18 of piston portion 12. On the other hand a relatively wide space is left between outer surface 34 of cylinder ring 28 and the inner wall 36 of rim 16; this relatively wide space actually consists of four separate linear channels 38a, 38b, 38c and 38d (FIGS. 1 and 2) which form four elongated, linear races between cylinder ring 28 and rim 16.

Figure 3:
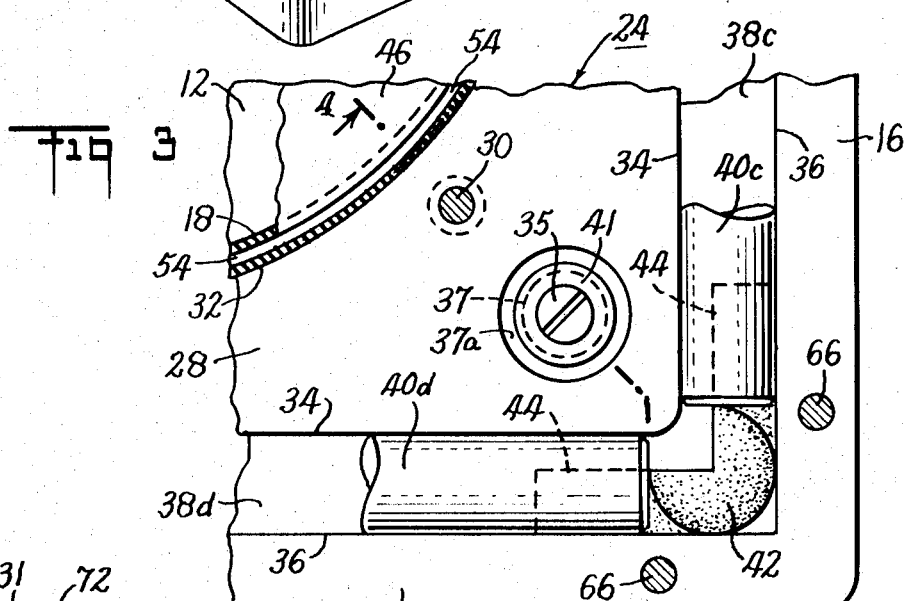
FIG. 3 is an enlarged partial sectional view taken along line 3—3 of FIG. 1 and showing the positioning of the roller bearings.
Figure 4:
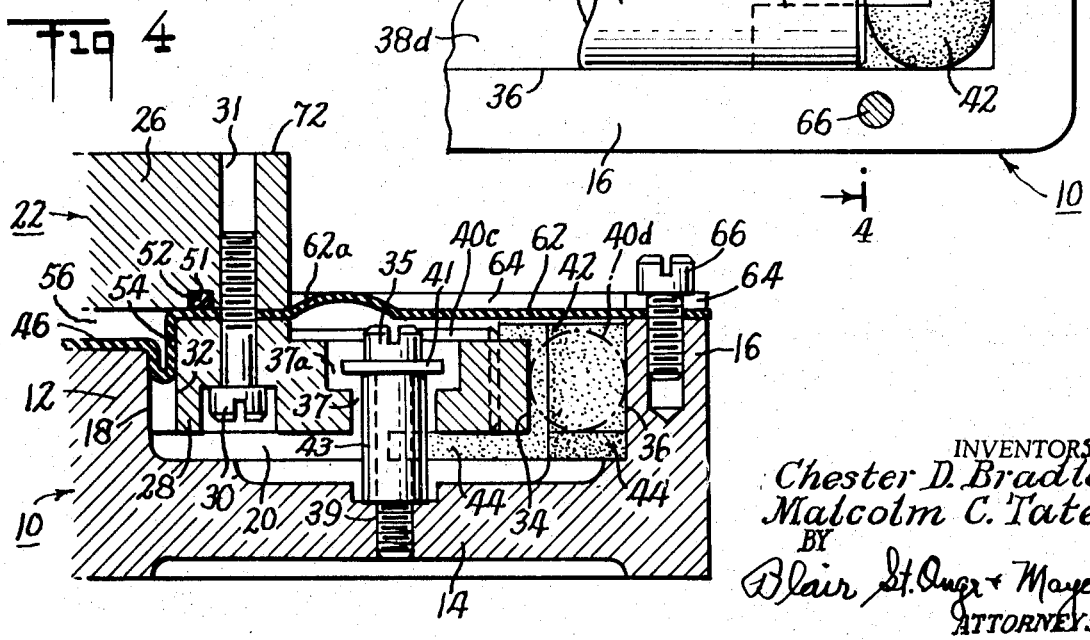
FIG. 4 is an enlarged partial sectional view taken along line 4—4 of FIG. 3.

Member 22 is loosely held to base member 10 by a pair of positioning screws 35 passing through diagonally opposite corners of cylinder ring 38 (FIG. 3). As shown in FIG. 4, each positioning screw 35 passes loosely through a counterbored clearance hole 37 in cylinder ring 28 and is threadedly secured at 39 to base member 10. Each screw 35 is also provided with a flange 41 which fits within the counterbore 37a but which is of larger diameter than clearance hole 37. Screws 35 thus permit relative axial and angular movement between members 10 and 22 but prevent accidental or inadvertent total separation thereof. Each screw 35 is also preferably provided with a sleeve 43 to accurately position the flange 41.

To facilitate relative axial and angular movement between members 10 and 22 and to prevent their binding under cross loading, they are assembled about roller bearings. Preferably, as shown in FIGS. 2 and 3, a single elongated, linear roller bearing 40a, 40b, 40c and 40d is provided in each corresponding race so that it maintains rolling contact with both outer surface 34 of cylinder ring 28 and inner surface 36 of rim 16. Also preferably, a resilient, elastomeric bumper 42 (FIGS. 3 and 4) is provided in the space between the ends of adjacent roller bearings to help prevent their lateral movement and keep them substantially centrally positioned within their respective races. Further, a resilient, elastomeric pad 44 is preferably provided to support the end of each roller bearing as shown in FIG. 3. It can be seen that as a result of its resilient construction, each pad 44 will yield upon downward telescopic movement between base member 10 and member 22 and their respective piston and cylinder portions. Such resilient yielding facilitates the roller bearings in rolling rather than skidding on the adjacent contacting walls. Both bumpers 42 and pads 44 may be made from rubber or a similar resilient, elastomeric material.

It can thus be seen that roller bearings 40a, 40b, 40c and 40d permit free relative axial and angular or tilting movement between base member 10 and member 22 and their respective piston and cylinder portions, while preventing any relative lateral movement therebetween. The use of such roller bearings results in a number of advantages as compared to the ball bearings used in prior load cells. For one thing they permit the load cell to function satisfactorily without binding under extremely high levels of cross loading. This is probably attributable to the continuous rolling contact between each roller bearing along its length adjacent the sidewalls, as contrasted to the point rolling contact made by ball bearings in a similar application. Also, the combination of a square configuration with roller bearings provides much higher resistance to torque than could be achieved with ball bearings in a circular race. Further, because any cross loading is uniformly distributed along the length of each roller bearing, the roller bearings are much less subject to failure under high levels of cross loading than are individual ball bearings. Single roller bearings are still further advantageous in that they allow for economies in the construction of the load cell. However, although single roller bearings are most advantageous, it is contemplated that several roller bearings might be used in each race without departing from the scope of the invention.

The load cell is further provided with a flexible diaphragm 46 between piston portion 12 and cylinder portion 24 as shown in FIG. 2. Flexible diaphragm 46 is preferably formed from a nonstretching sheet material of synthetic fiber such as Dacron coated with an elastomer such as rubber or the like; it is provided with a centrally positioned, protruding button portion 48 which fits into a mating recess 50 in base member 10 to center and help secure the diaphragm. Diaphragm 46 as shown lays along the top of piston portion 12 and is clamped between cylinder ring 28 and cap block 26. Preferably, an O-ring 51 is provided in a recess 52 in cap block 26 on the surface abutting the flexible diaphragm to form a fluidtight seal.

As further shown in FIG. 2, a slack fold 54 of diaphragm 46 is permitted to protrude into the clearance space between cylinder ring 28 and piston portion 12. The purpose of fold 54 is to provide sufficient slack in diaphragm 46 so that piston portion 12 can move axially within cylinder portion 24 without overstressing or rupturing the diaphragm, while maintaining a precise acting area.

There is thus provided between piston portion 12 and cylinder portion 24 a sealed, fluid pressure chamber 56 into which may be placed a quantity of hydraulic fluid which acts as the pressure-transferring medium of the hydraulic load cell. A pair of L-shaped pressure ports 58 are provided in opposite sides of cap block 26 in communication with pressure chamber 56, and the ports terminate in an external fitting 60 to which a pressure line may be connected. The pressure line may then be connected to a pressure-sensing instrument for monitoring the load cell output.

The flexible diaphragm of the cell of the invention further preferably functions as a protective jacket. For this purpose diaphragm 46 is provided with an extended lateral flange 62 (FIGS. 1, 2 and 4) which extends over each race and the roller bearing therein, and out to the edge of rim 16 on base member 10. A separate sealing strip 64 secured to the top of each side of rim 16 by a plurality of capscrews 66 or the like (FIGS. 1 and 4) serves to clamp the extended flange 62 of diaphragm 46 securely and in a dusttight manner to base member 10. The extended flange 62 of flexible diaphragm 46 thus serves as an integral protective jacket which overlies and seals each race to protect it and the bearing therein against intrusion of dust or other abrasive or corrosive contaminants from the atmosphere. The extended flange 62 of flexible diaphragm 46 is also preferably provided with a ring-shaped, convexly deformed portion 62a which provides sufficient slack in the extended flange to prevent it from being overstressed or ruptured by the relative axial and angular movements between base member 10 and member 22.

The load cell may also be provided with a gauging hole 63 (FIGS. 1 and 2) on one or more ends of base member 10. Gauging holes 63 permit the insertion of a feeler gauge or the like to measure the gauging clearance "d" (FIG. 2). Each gauging hole 63 may be sealed when not in use by a removable threaded plug (not shown). By having the gauging holes located in base member 10 as shown, gauging may be accomplished without disturbing the protective jacket over each race.

As previously discussed, the load cell may also be subjected to cross loading as a result of the thermal expansion or contraction of members such as weighing containers which rest upon or are secured to the load cell loading surface, or due to lateral movement when weighing rolling vehicles. The lateral thrust caused by such cross loads may be excessive and cause failure or inaccuracy in the load cell unless compensated for or absorbed. For this purpose, the load cell of the invention is preferably provided with a sliding load head structure 68 as shown in FIGS. 1 and 2.

Load head structure 68 comprises a flat loading plate 70 mounted over the loading surface 72 of cap block 26. Loading plate 70 is supported above cap block 26 on a lubricated washer 74 which is preferably in the shape of a ring. Washer 74 preferably fits around a shallow hub 76 projecting from the bottom of loading plate 70 as shown in FIG. 2. The washer may be formed of any suitable self-lubricating material; preferably however it consists of a carbon steel base ring covered with a thin layer of sintered, porous bronze which is impregnated with polytetrafluoroethylene resin and lead powder. Washer 74 thus provides a low friction member between loading plate 70 and loading surface 72 which needs no external lubrication. Because of its composition, washer 74 will function satisfactorily under corrosive conditions and over a wide range of temperatures.

Preferably, the area of loading surface 72 directly under washer 74 is smooth to further reduce friction and facilitate the sliding of loading plate 70 under the influence of cross loads. This may be accomplished by machining or polishing surface 72, but preferably a separate disc 77 (FIGS. 1 and 2) is provided under washer 74 to eliminate the need for such machining or polishing. Disc 77 is provided with a low friction surface and may be made, for example, of smooth, thin, stainless steel sheet.

Loading plate 70 is kept on cap block 26 by means of a capscrew 78. Capscrew 78 passes first through a holddown plate 80 resting on loading plate 70, and then through plate 70 into threaded engagement with cap block 26 as shown in FIG. 2. As is further shown, sufficient clearance is left between holddown plate 80 and capscrew 78, and also between loading plate 70 and capscrew 78 so that, within limits, substantially universal sliding movement is permitted between loading plate 70 and cap block 26. Preferably, loading plate 70 and capscrew 78 are provided in a recessed portion 82 of loading plate 70. In this way the upper surface 84 of plate 70 remains flat to facilitate the mounting of external structures for weighing.

As can be seen, load head structure 68 serves to absorb any lateral thrust applied thereto by sliding; it thus prevents such lateral thrust from producing excessive cross loading against roller bearings 40a, 40b, 40c and 40d.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

1. A load cell comprising, in combination:
   A. a base member,
   B. a second member telescopically assembled with said base member,
   C. means forming a cylinder portion on one end of one of said members,
   D. means forming a cooperative piston portion on the other of said members extending into said cylinder portion for relative telescopic movement therewith,
   E. means forming a sealed fluid pressure chamber between said cylinder and piston portions,
   F. means forming an elongated race extending perpendicularly to the axis of said load cell between each and extending substantially the length of the adjacent, telescoped sides of said base member and said second member, and
   G. at least one roller bearing supported in a single plane in each said race, said roller bearings extending substantially the length of an in rolling contact with said adjacent telescoped sides to permit free relative axial and angular movement between said base member and said second member and thereby substantially reduce the possibility of binding due to cross loading.

2. A load cell as defined in claim 1 wherein the telescoped sides of said base and second members are of polygonal configuration, each said race being linear and extending substantially the length of its corresponding sides, and at least one linear roller bearing disposed in each said race and extending substantially the length thereof, said polygonally oriented roller bearings thereby providing high resistance to torque.

3. A load cell as defined in claim 2 wherein said base member comprises a central, raised, cylindrical piston portion and a surrounding flange terminating in a raised rim of polygonal configuration, said second member comprising a cap block having a cylinder ring projecting therefrom, said cylinder ring having a cylindrical inner surface corresponding to said piston portion and a polygonal outer surface corresponding to said raised rim, said second member being assembled with said base member with said cylinder ring telescopically encircling said piston portion and being spaced from said rim whereby said races are formed between the adjacent spaced polygonal sides of said cylinder ring and raised rim.

4. A load cell as defined in claim 1 including resilient pads supporting each said roller bearing in its corresponding race and facilitating each roller bearing to make rolling contact with the adjacent telescoped sides of said base member and said second member.

5. A load cell as defined in claim 1 including a sliding load head structure comprising a loading plate slidably mounted to the loading surface of said second member, a lubricant impregnated washer underlying and supporting said loading plate on said loading surface, and means forming a low friction area on said loading surface underlying said washer.

6. A load cell as defined in claim 5 wherein said low friction area comprises a separate plate with a low friction surface mounted on said loading surface under said washer.

7. A load cell as defined in claim 1 including a fluid impervious flexible diaphragm interposed between said cylinder and piston portions to form sealed fluid pressure chamber, said flexible diaphragm extending laterally and being secured over said races and the roller bearings therein to form a protective jacket against intrusion of dust or other contaminants.

8. In a load cell, a sliding load head structure to accommodate lateral thrust comprising, in combination:
   A. a loading plate slidably mounted to the loading surface of said load cell,
   B. a lubricant impregnated washer underlying and supporting said loading plate on said loading surface, and
   C. means forming a low friction area on said loading surface underlying said washer.

9. A sliding load head structure as defined in claim 8 wherein said low friction area comprises a separate plate having a low friction surface and mounted on said loading surface under said washer.

10. In a load cell having a sealed fluid pressure chamber defined by a cylinder portion on a first member, a cooperating piston portion on a second member and a fluid impervious flexible diaphragm interposed between said cylinder portion and said piston portion, and wherein said first and second members are assembled for relative axial movement about bearings positioned laterally of said diaphragm in position to intersect a lateral plane thereof, said diaphragm comprising a sheet having a flange extended laterally to overlie said bearings and being secured thereover to form a protective jacket against intrusion of dust or other contaminants.

11. A load cell comprising, in combination:
   A. a base member,
   B. a second member telescopically assembled with said base member,
   C. means forming a cylinder portion on one end of one of said members,
   D. means forming a cooperative piston portion on the other of said members extending into said cylinder portion for relative telescopic movement therewith,
      1. said piston portion being of smaller diameter than said cylinder portion so that clearance is provided therebetween for limited relative angular movement,
   E. means forming an elongated race extending perpendicularly to the axis of said load cell between each of the adjacent, telescoped sides of said base member and said second member, F. at least one roller bearing in each said race in rolling contact with said adjacent telescoped sides to permit free relative axial and angular movement between said base member and said second member, G. a fluid impervious flexible diaphragm interposed between said cylinder portion and said piston portion to form a sealed fluid pressure chamber therebetween at a level within said cell whereby lateral planes of said pressure chamber are intersected by said races and said roller bearings, said diaphragm further having a flange which is extended laterally to overlie said races and the roller bearings therein and secured to form a protective jacket against intrusion of dust or other contaminants, and H. a sliding load head structure comprising a loading plate slidably mounted to the loading surface of said second member, a lubricant impregnated washer underlying and supporting said loading plate on said loading surface, and means forming a low friction area on said loading surface underlying said washer.

* * * * *

UNITED STATES PATENT OFFICE
CERTIFICATE OF CORRECTION

Patent No. 3,646,854         Dated March 7, 1972

Inventor(s) Chester D. Bradley and Malcolm C. Tate

It is certified that error appears in the above-identified patent and that said Letters Patent are hereby corrected as shown below:

Column 2, line 40, "drawings" should be --drawing--.
Column 3, line 14, "38" should be --28--.
Column 5, line 61, after "second member," delete "and" and insert on next line --1. each said race being spaced from said pressure chamber in a lateral plane thereof, and--;
Column 5, line 63, after "race" delete the comma and insert --in position to intersect a lateral plane of said pressure chamber,--; Column 5, line 64, after "length of" change "an" to --and-- and insert --being-- before "in".

Signed and sealed this 26th day of September 1972.

(SEAL)
Attest:

EDWARD M. FLETCHER, JR.
Attesting Officer

ROBERT GOTTSCHALK
Commissioner of Patents